United States Patent
Chen et al.

(10) Patent No.: US 11,042,225 B2
(45) Date of Patent: Jun. 22, 2021

(54) SYSTEM AND METHOD FOR KEYBOARD MODE SWITCHING

(71) Applicant: Acer Incorporated, New Taipei (TW)

(72) Inventors: En-Shin Chen, New Taipei (TW);
Yun-Hao Chou, New Taipei (TW);
An-Cheng Lee, New Taipei (TW);
Ying-Shih Hung, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/872,377

(22) Filed: May 12, 2020

(65) Prior Publication Data

US 2021/0124429 A1    Apr. 29, 2021

(30) Foreign Application Priority Data

Oct. 29, 2019   (TW) .................................. 108139031

(51) Int. Cl.
*G06F 3/023*    (2006.01)
*G06F 3/02*     (2006.01)

(52) U.S. Cl.
CPC .......... *G06F 3/0238* (2013.01); *G06F 3/0202* (2013.01)

(58) Field of Classification Search
CPC ............................ G06F 3/0238; G06F 3/0202
USPC ....................................................... 345/168
See application file for complete search history.

(56) References Cited

U.S. PATENT DOCUMENTS

| | | | |
|---|---|---|---|
| 6,990,441 B1* | 1/2006 | Bolme | G06F 3/0233 |
| | | | 704/8 |
| 2010/0100359 A1* | 4/2010 | Podoloff | G06F 3/038 |
| | | | 702/191 |
| 2018/0359107 A1* | 12/2018 | Asher | G06N 3/08 |

FOREIGN PATENT DOCUMENTS

| | | | |
|---|---|---|---|
| CN | 101349987 | | 1/2009 |
| TW | 200719204 | | 5/2007 |
| TW | 200814900 | | 3/2008 |
| TW | 200948020 | | 11/2009 |
| TW | 201516852 | | 5/2015 |
| TW | I646446 | | 1/2019 |
| TW | I646446 B | * | 4/2019 |

OTHER PUBLICATIONS

"Office Action of Taiwan Counterpart Application", dated Dec. 16, 2020, p. 1-p. 5.

* cited by examiner

*Primary Examiner* — Mark Edwards
(74) *Attorney, Agent, or Firm* — JCIPRNET

(57) ABSTRACT

A keyboard mode switching system and method are provided. The method includes: obtaining the current window information of the currently executed window; comparing multiple records in the database according to the current window information; and when the first record corresponding to the current window information exists, switching the current keyboard operation mode currently used by the keyboard to the first keyboard operation mode in the first record so that the keyboard receives the user's input according to the first keyboard operation mode.

16 Claims, 12 Drawing Sheets

| Title | Process name | Keyboard operation mode |
|---|---|---|
| Word | WINWORD.EXE | Typing Mode |
| Excel | EXCEL.EXE | Typing Mode |
| PowerPoint | POWERPNT.EXE | Typing Mode |
| Notepad | notepad.exe | Typing Mode |
| Forza Motorsport 7 | ForzaMotorsport7.exe | Racing Mode |
| Dirt Rally 2 | DirtRally2.exe | Racing Mode |
| Forza Horizon 4 | ForzaHorizon4.exe | Racing Mode |
| Project CARS 2 | ProjectCARS2.exe | Racing Mode |
| Counter-Strike: Global Offensive | CounterStrikeGlobalOffensive.exe | FPS Mode |
| Warframe | Warframe.exe | FPS Mode |
| Team Fortress 2 | TeamFortress2.exe | FPS Mode |
| Unturned | Unturned.exe | FPS Mode |
| Uncharted | Uncharted.exe | Linear Mode |
| Shadow of the Tomb Raider | ShadowoftheTombRaider.exe | Linear Mode |
| Batman: Arkham Asylum Game of the Year Edition | BatmanArkhamAsylumGameoftheYearEdition.exe | Linear Mode |
| Dead Space | DeadSpace.exe | Linear Mode |

FIG. 3

SYSTEM AND METHOD FOR KEYBOARD MODE SWITCHING

CROSS-REFERENCE TO RELATED APPLICATION

This application claims the priority benefit of Taiwan application serial no. 108139031, filed on Oct. 29, 2019. The entirety of the above-mentioned patent application is hereby incorporated by reference herein and made a part of this specification.

BACKGROUND

Field of the Disclosure

The disclosure relates to a keyboard mode switching system and method.

Description of Related Art

The e-sports craze continues to continue, and equipment that can support e-sports is even more indispensable. Generally speaking, the main requirements of game keyboards are the player's control and accuracy of the keyboard. In particular, for the current keyboard keys for e-sports, a corresponding value can be obtained according to the depth of the key that is pressed, and the device can perform the corresponding operation according to the corresponding value. The relative relationship between the "depth of key pressed" and "corresponding value" can be referred to as "linearity", and the linearity can be represented by a graph. However, since the linearity of each game or application is different, a device usually stores multiple keyboard operation modes, and each keyboard operation mode will have a corresponding graph. In the related art, the user still needs to manually switch between the multiple keyboard operation modes through the application program. Therefore, how to propose a system and method for switching between multiple keyboard operation modes is one of the problems to be solved by those skilled in the art.

SUMMARY OF THE DISCLOSURE

The disclosure provides a keyboard mode switching system and method, which can automatically determine the application program currently used by the user, and automatically switch to the keyboard operation mode corresponding to the application program.

The disclosure provides a keyboard mode switching system for switching between multiple keyboard operation modes of a keyboard. The system includes: a database and a processor. The database stores multiple records, wherein each of the multiple records is configured to store one of the multiple keyboard operation modes. The processor is configured to access multiple modules to perform the following operations: obtaining a current window information of a currently executed window; comparing the multiple records based on the current window information; and when there is a first record corresponding to the current window information in the multiple records, switching a current keyboard operation mode currently used by the keyboard to a first keyboard operation mode in the first record so that the keyboard receives the user's input according to the first keyboard operation mode.

The disclosure provides a keyboard mode switching method for a keyboard mode switching system to switch between multiple keyboard operation modes of a keyboard. The method includes: storing multiple records in a database, wherein each of the multiple records is configured to store one of the multiple keyboard operation modes; obtaining a current window information of a currently executed window; comparing the multiple records based on the current window information; and when there is a first record corresponding to the current window information in the multiple records, switching a current keyboard operation mode currently used by the keyboard to a first keyboard operation mode in the first record so that the keyboard receives the user's input according to the first keyboard operation mode.

Based on the above, the keyboard mode switching system and method of the disclosure can automatically determine the application currently used by the user, and automatically switch to the keyboard operation mode corresponding to the application, thereby improving the efficiency of the user's rapid operation, optimizing the user experience and adding value to the product.

BRIEF DESCRIPTION OF THE DRAWINGS

FIG. 3 is a schematic diagram of a stored record according to an embodiment of the disclosure.

DESCRIPTION OF EMBODIMENTS

Figure 1:
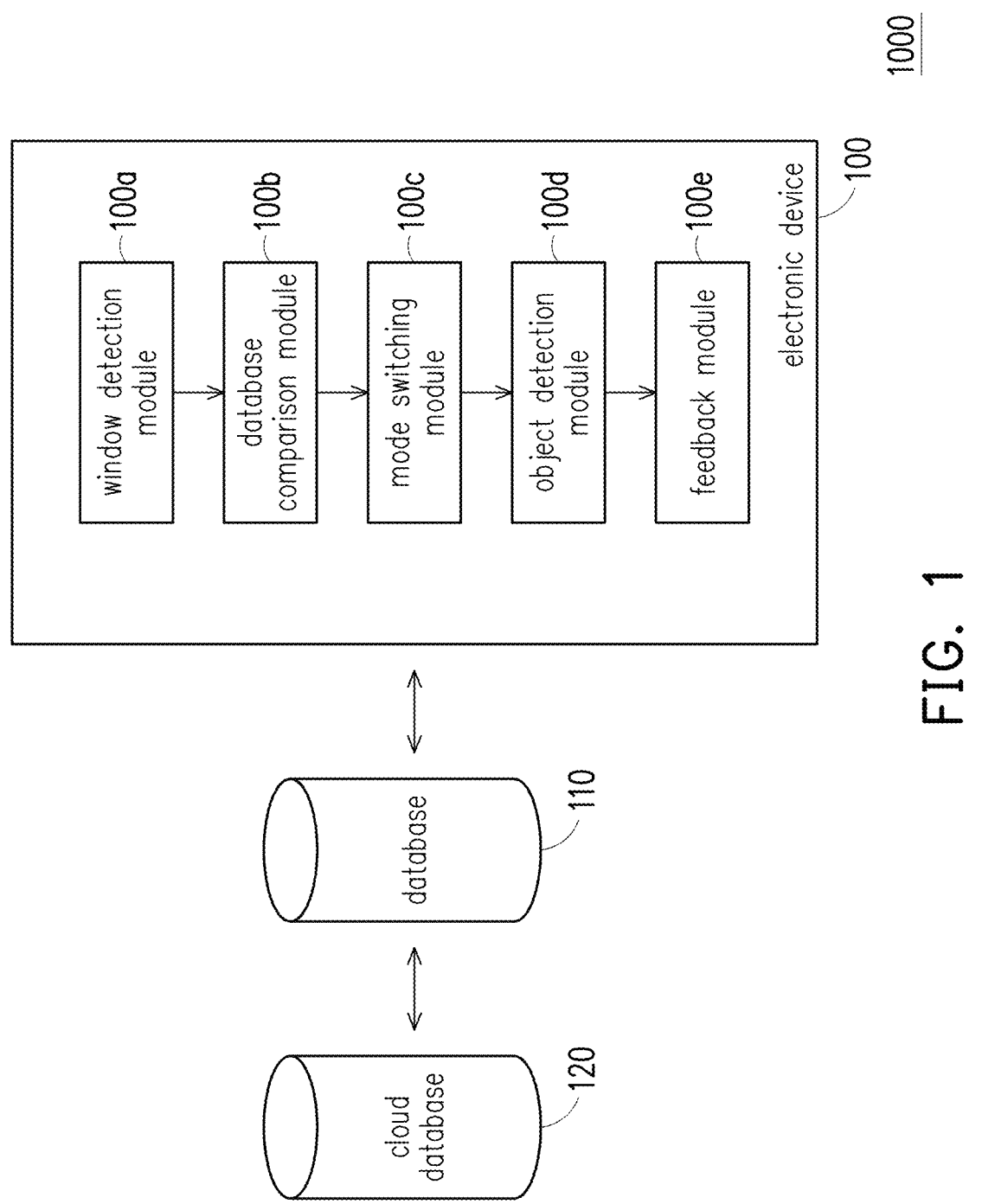
FIG. 1 is a block diagram of a keyboard mode switching system according to an embodiment of the disclosure.

FIG. 1 is a block diagram of a keyboard mode switching system according to an embodiment of the disclosure.

Referring to FIG. 1, the keyboard mode switching system 1000 of the disclosure may include an electronic device 100, a database 110, and a cloud database 120. The electronic device 100 may be coupled to the database 110 in a wireless or wired manner, and the database 110 may be coupled to the cloud database 120 in a wireless or wired manner. The electronic device 100 may be a smart phone, a tablet computer, a notebook computer, a personal computer, etc. connected to a keyboard.

The electronic device 100 includes a communication chip (not shown), a storage device (not shown), and a processor (not shown).

The communication chip may be a system that supports Global System for Mobile Communication (GSM), Personal Handy-phone System (PHS), Code Division Multiple Access (CDMA) system, Wideband Code Division Multiple Access (WCDMA) system, Long Term Evolution (LTE) system, Worldwide Interoperability for Microwave Access (WiMAX) system, and Wireless Fidelity (Wi-Fi) system or Bluetooth signal transmission elements.

The storage device may be any type of fixed or removable random access memory, read only memory, flash memory, hard drive, solid state drive, or the like, or a combination thereof.

The processor may be a central processing unit, or other programmable general-purpose or special-purpose microprocessors, digital signal processors, programmable controllers, special-purpose integrated circuits or other similar components or a combination of the above.

In the exemplary embodiment, the storage device of the electronic device 100 stores multiple code segments, and after the above code segments are installed, they are respectively executed by the processor of the electronic device 100. For example, the storage device of the electronic device 100 includes a window detection module 100a, a database comparison module 100b, a mode switching module 100c, an object detection module 100d, and a feedback module 100e. The above modules are used to respectively perform various operations applied to the keyboard mode switching system 1000, wherein each of the modules is composed of one or more code segments. However, the disclosure is not limited thereto, and the above operations may also be implemented in the form of other hardware.

Figure 2A:
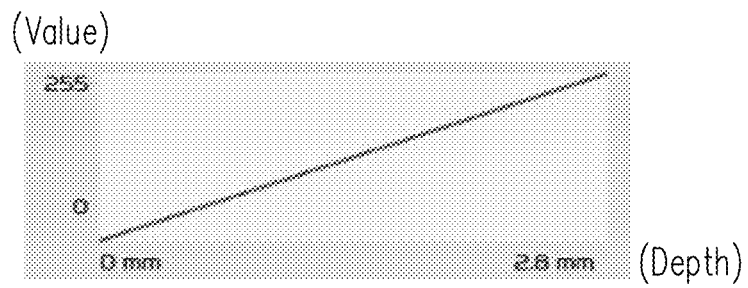
FIG. 2A to FIG. 2C are schematic diagrams of game modes according to an embodiment of the disclosure.
Figure 2B:
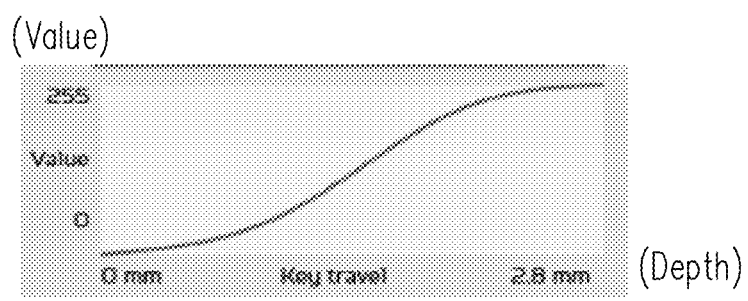
Figure 2C:
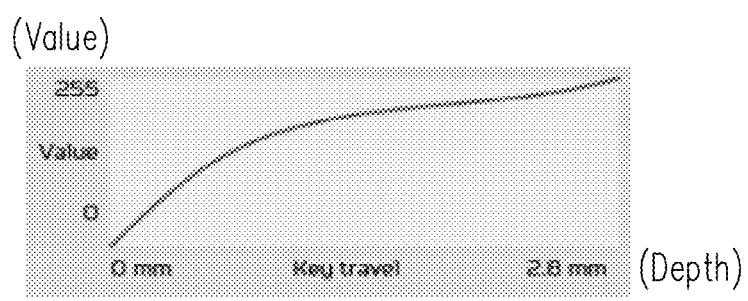

In the embodiment, it is assumed that the keyboard operation modes include a game mode and a typing mode, among which the game mode also includes a linear mode, a racing mode and a first-person shooting mode (FPS mode). FIG. 2A to FIG. 2C are schematic diagrams of game modes according to an embodiment of the disclosure. Please refer to FIG. 2A to FIG. 2C. FIG. 2A is a graph in a linear mode. The horizontal axis represents the depth at which the key is pressed, and the vertical axis represents the value corresponding to each depth, and the processor can perform the corresponding operation according to this value. Similarly, FIG. 2B is a graph of the racing mode and FIG. 2C is a graph of the FPS mode. In addition, different from the graph of the game mode, the "typing mode" mainly includes a threshold. When the depth at which the key is pressed is greater than this threshold, the processor will perform the corresponding operation. For example, the signal of the key is received and the corresponding operation is performed according to the signal. When the depth at which the key is pressed is not greater than the threshold, the processor will not perform the corresponding operation according to the signal of the key.

Specifically, the database 110 and the cloud database 120 of the disclosure store multiple records, wherein each of the multiple records is configured to store one of the multiple keyboard operation modes. For example, FIG. 3 is a schematic diagram of a stored record according to an embodiment of the disclosure.

Referring to FIG. 3, the database 110 and the cloud database 120 may store a Table 200 as shown in FIG. 2. Each row in the Table 200 is configured to record the multiple records. The first column of the Table 200 is configured to record the title of window, the second column is configured to record the process name, and the third column is configured to record the keyboard operation mode. Take record R1 as an example, the title of record R1 is "Word", the process name thereof is "WINWORD.EXE" and the keyboard operation mode thereof is "Typing mode".

Figure 4:
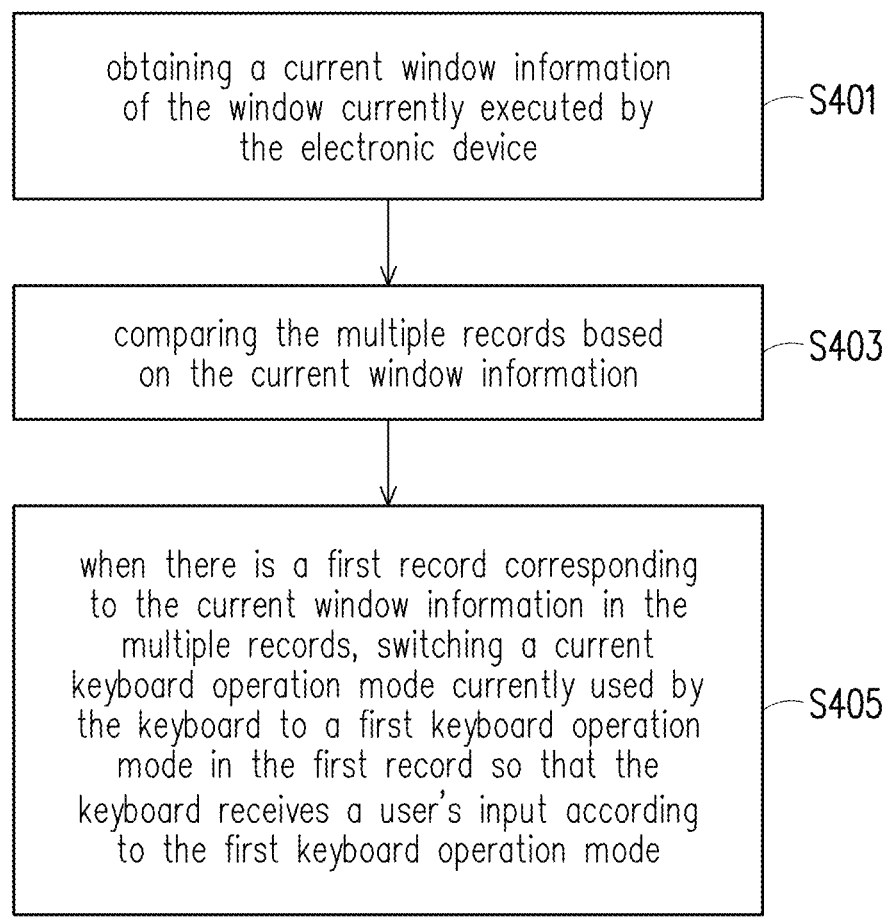
FIG. 4 is a flowchart of a keyboard mode switching method according to an embodiment of the disclosure.

FIG. 4 is a flowchart of a keyboard mode switching method according to an embodiment of the disclosure.

Referring to FIG. 4, in step S401, the window detection module 100a obtains a current window information of the window currently executed by the electronic device 100. In step S403, the database comparison module 100b compares multiple records in the database 110 based on the current window information. When there is a record (also referred to as a first record) corresponding to the current window information in the multiple records, in step S405 the mode switching module 100c switches a current keyboard operation mode currently used by the keyboard to the keyboard operation mode (also referred to as the first keyboard operation mode) recorded in the first record such that the keyboard receives the user's input according to the first keyboard operation mode.

Figure 5:
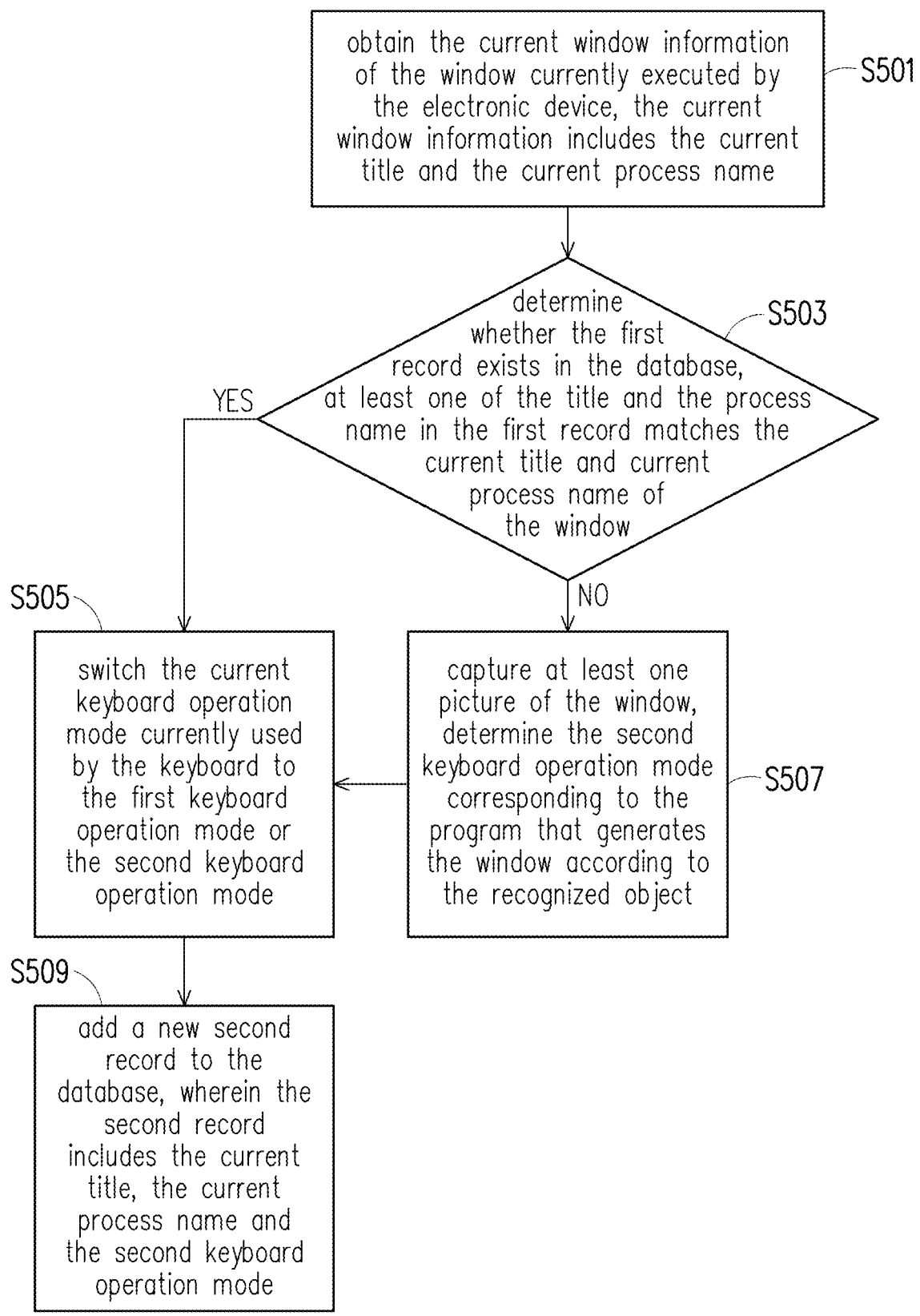
FIG. 5 is a flowchart of a more detailed keyboard mode switching method according to an embodiment of the disclosure.

More specifically, FIG. 5 is a flowchart of a more detailed keyboard mode switching method according to an embodiment of the disclosure.

Figure 6:
FIG. 6 is a schematic diagram of the current title and the current process name according to an embodiment of the disclosure.

Please refer to FIG. 5, in step S501, the window detection module 100a will obtain the current window information of the window currently executed by the electronic device 100. The current window information includes the title of the window (hereinafter referred to as the current title) and the name of the program that executes the window (hereinafter referred to as the name of the current program). For example, the window detection module 100a makes use of a window application program interface (WinAPI) to obtain the current title and the current process name. The "current title" can be obtained by using functions such as "GetForegroundWindow( )", "GetWindowTextLength( )", or "GetWindowText( )". The "current process name" can be obtained by using functions such as "GetWindowThreadProcessId( )" or "GetModuleBaseName( )". FIG. 6 is a schematic diagram of the current title and the current process name according to in an embodiment of the disclosure. Please refer to FIG. 6. In the example of FIG. 6, the current title obtained by using the aforementioned function is "document 1", and the current process name obtained by using the aforementioned function is "WINWORD.EXE"

Please refer to FIG. 5 again, in step S503, the database comparison module 100b determines whether the first record exists in the database 110, at least one of the title and the process name in the first record matches the current title and current process name of the window. For example, FIG. 7A and FIG. 7B are schematic diagrams illustrating the operation of the database comparison module according to an embodiment of the disclosure.

Figure 7A:
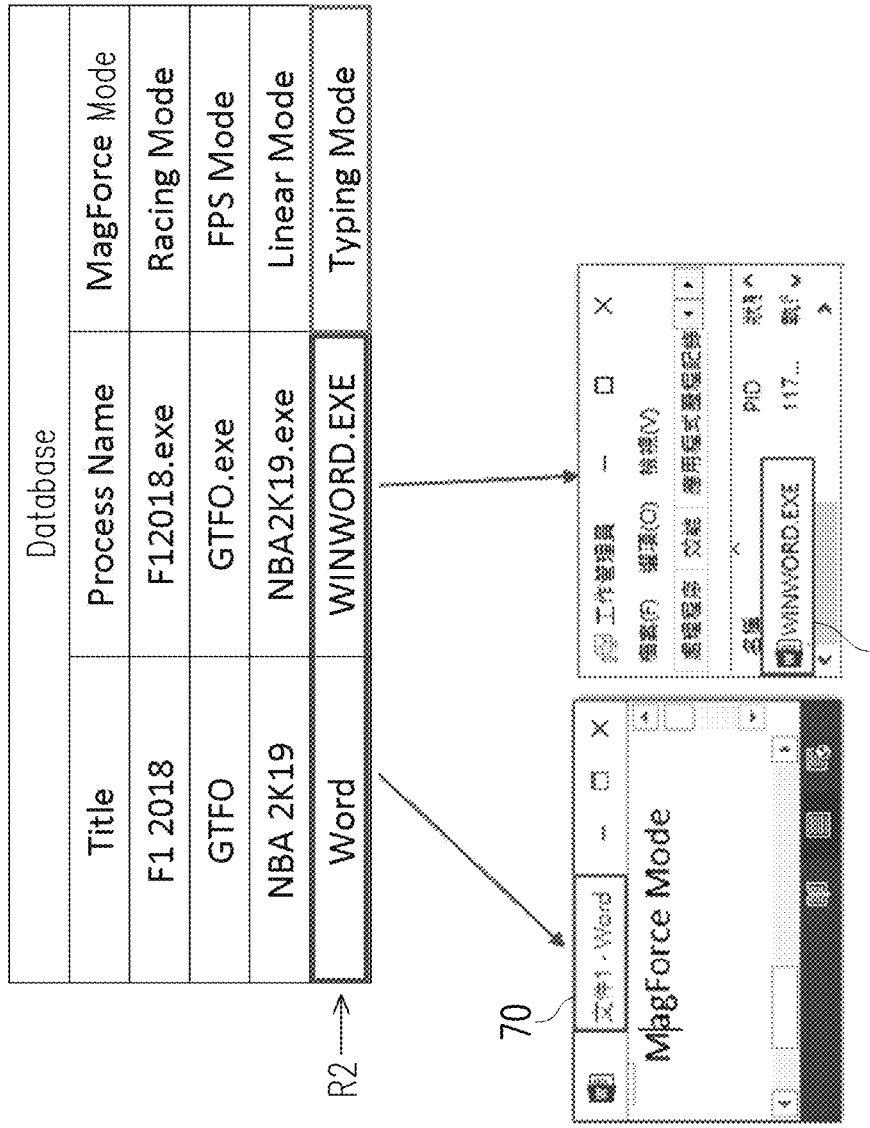
FIG. 7A and FIG. 7B are schematic diagrams illustrating the operation of the database comparison module according to an embodiment of the disclosure.

Please refer to FIG. 7A, assuming that the current title 70 obtained in step S501 is "document 1-Word" and the current process name 71 is "WINWORD.EXE". The database comparison module 100b can find the record R2 from the database 110 and recognize the record R2 as the aforementioned first record, wherein the title of the record R2 is "Word" and the process name is "WINWORD.EXE". It should be noted that in this example, the title of the record R2 is different from the current title 70 but the process name of the record R2 is the same as the current process name. In other words, as long as a record exists in the database 110, and one of the conditions "the title in the record is the same as the current title" and "the process name in the record is the same as the current process name" is established, the record will be recognized as the first record.

Figure 7B:
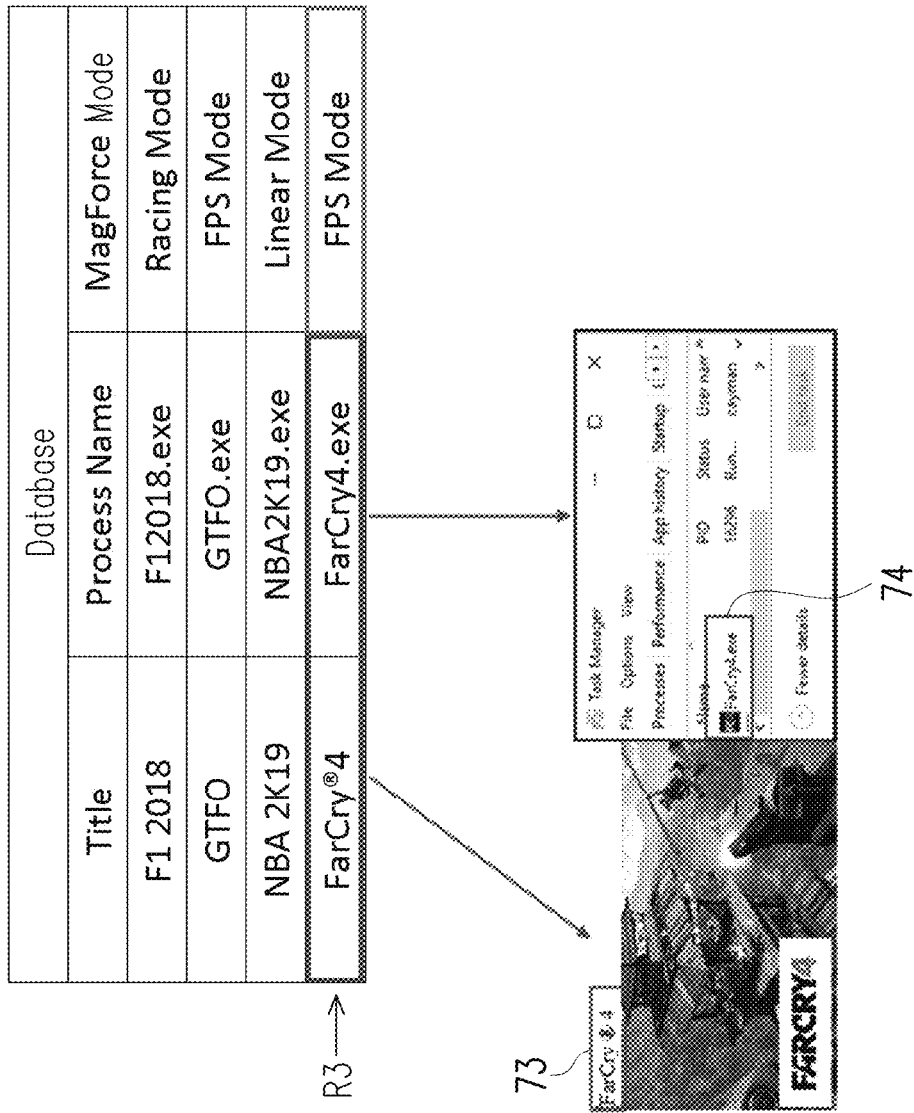

In another example, please refer to FIG. 7B, assuming that the current title 73 obtained in step S501 is "FarCry®4" and the current process name 74 is "FarCry.exe". The database comparison module 100b can find the record R3 from the database 110 and recognize the record R3 as the first record, wherein the title of record R3 is "FarCry®4" and the process name is "FarCry.exe". It should be noted that in this example, the title of the record R3 is the same as the current title 73 and the process name of the record R3 is the same as the current process name. In other words, as long as there is a record in the database 110, and both of the conditions "the title in the record is the same as the current title" and "the process name in the record is the same as the current process name" are established, the record will also be recognized as the first record.

Referring again to FIG. 5, when there is a first record and the keyboard operation mode (i.e., the first keyboard operation mode described above) in the first record is different from the current keyboard operation mode currently used by the keyboard, in step S505, the mode switching module 100c switches the current keyboard operation mode currently used by the keyboard to the first keyboard operation mode in the first record, so that the keyboard receives the user's input according to the first keyboard operation mode. Taking the example in FIG. 7A as an example, the mode switching module 100c will switch the current keyboard operation mode currently used by the keyboard to the "typing mode" recorded in the record R2 so that the keyboard receives the user's input according to the typing mode. Taking the example in FIG. 7B as an example, the mode switching module 100c will switch the current keyboard operation mode currently used by the keyboard to the "FPS mode" recorded in the record R3 so that the keyboard receives the user's input according to the FPS mode.

Please refer to FIG. 5 again, when there is no first record, in step S507, the object detection module 100d captures at least one picture of the window, recognizes at least one object in the picture, and determines the keyboard operation mode (also referred to as the second keyboard operation mode) corresponding to (or applicable to) the program that generates the window according to the recognized object. Then, in step S505, the mode switching module 100c switches the current keyboard operation mode currently used by the keyboard to the second keyboard operation mode so that the keyboard receives the user's input according to the second keyboard operation mode.

Figure 8A:
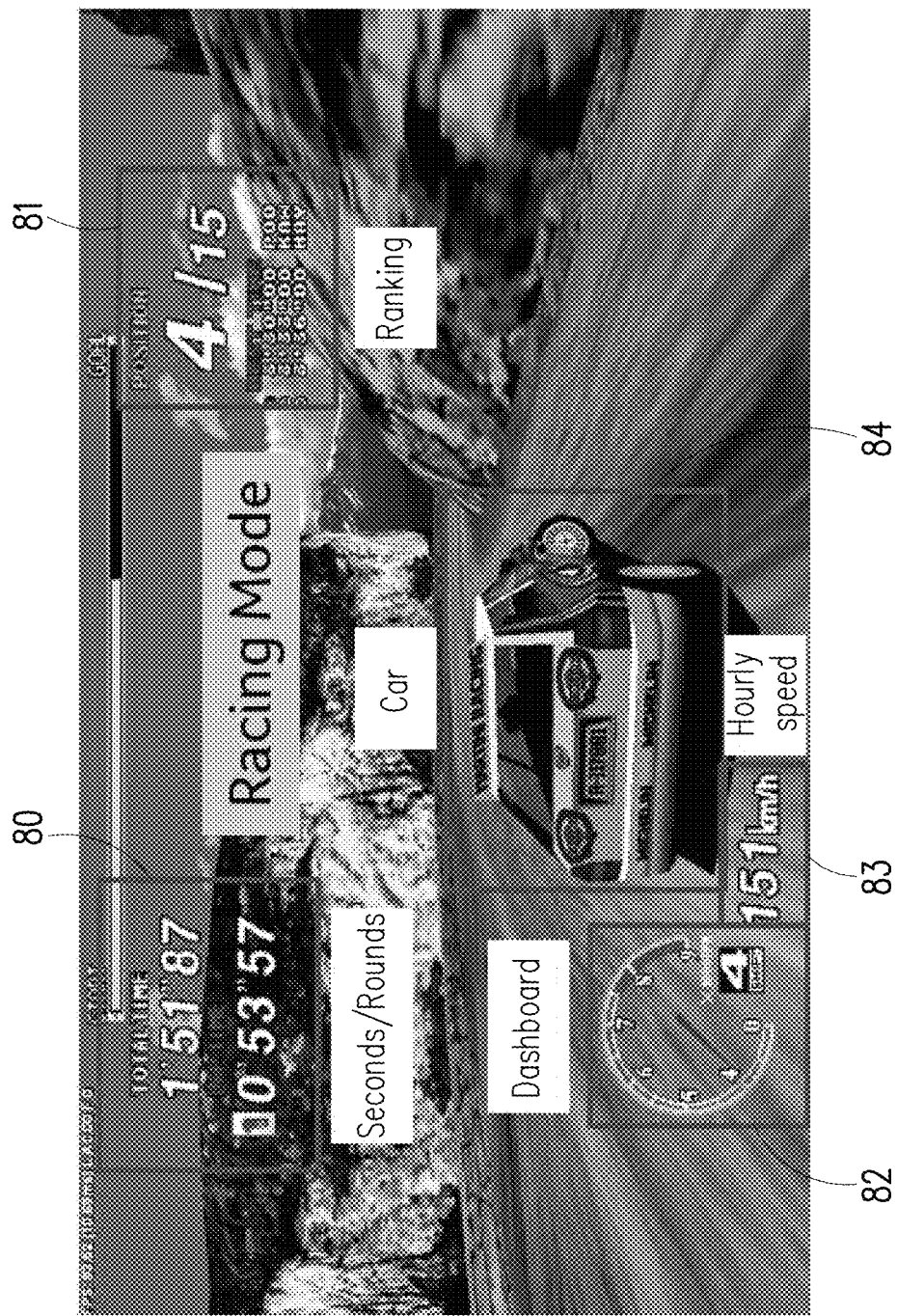
FIG. 8A to FIG. 8C are schematic diagrams of objects in the recognition picture according to an embodiment of the disclosure.
Figure 8B:
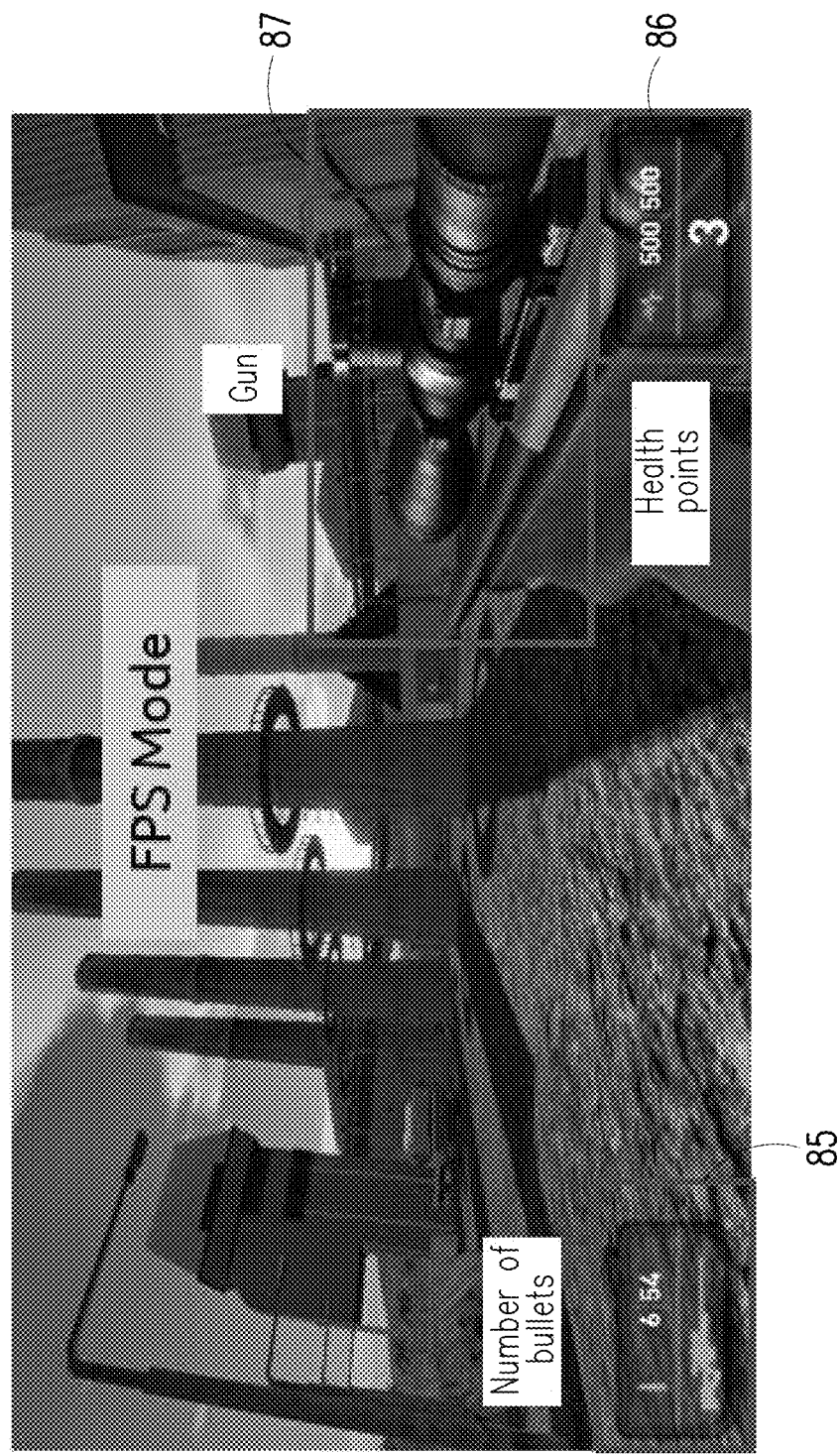
Figure 8C:
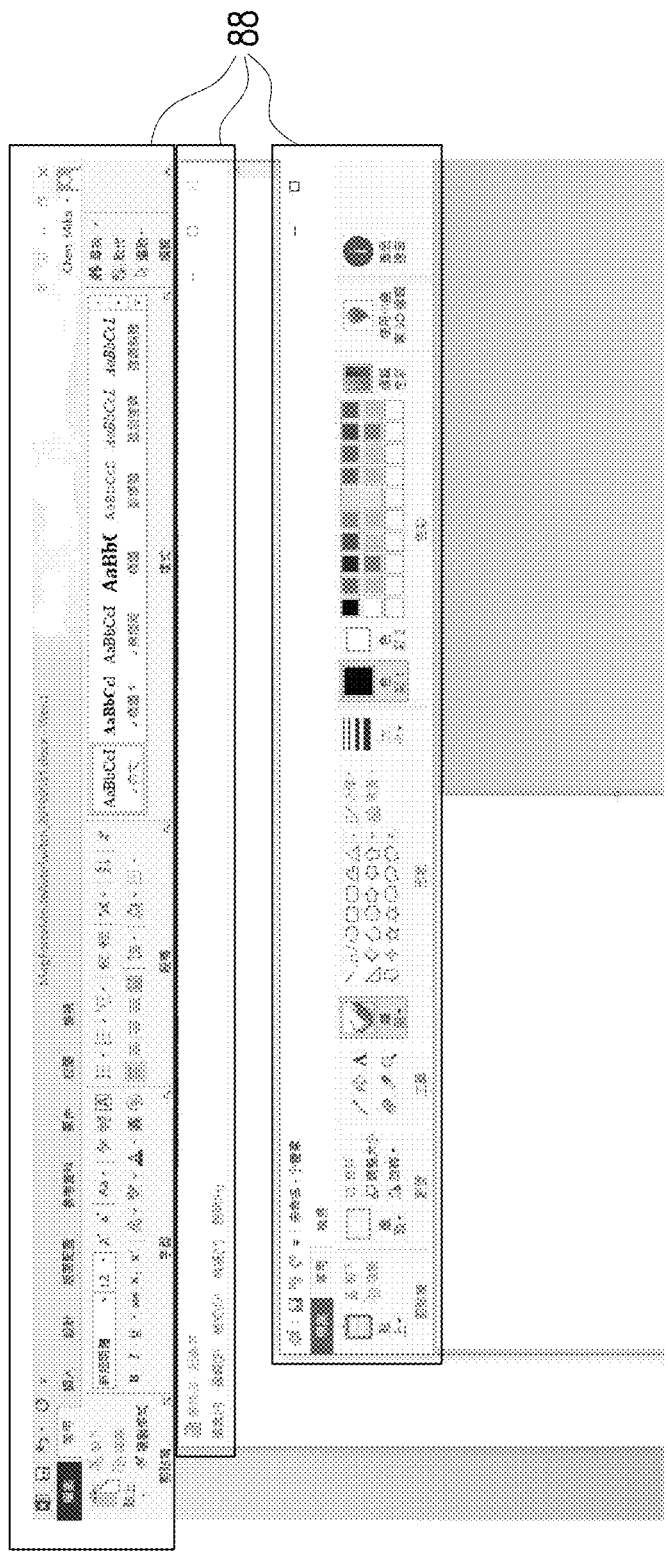

For example, FIG. 8A to FIG. 8C are schematic diagrams of objects in the recognition picture according to an embodiment of the disclosure. The processes of FIG. 8A and FIG. 8C can be completed by using, for example, machine learning methods.

Referring to FIG. 8A, the object detection module 100d can recognize objects in a racing game picture from the image of FIG. 8A, which may include: a timer 80 (e.g., seconds and/or rounds), ranking 81, a dashboard 82, hourly speed 83 and a car 84 etc. Alternatively, referring to FIG. 8B, the object detection module 100d can recognize the objects in the first-person shooting game picture from the image in FIG. 8B, which may include: the number of bullets 85, health points 86, and a gun 87. Alternatively, referring to FIG. 8C, the object detection module 100d can recognize the objects in the picture of the program for editing a document from the image in FIG. 8C, which may include: a toolbar 88 and the like.

Figure 9:
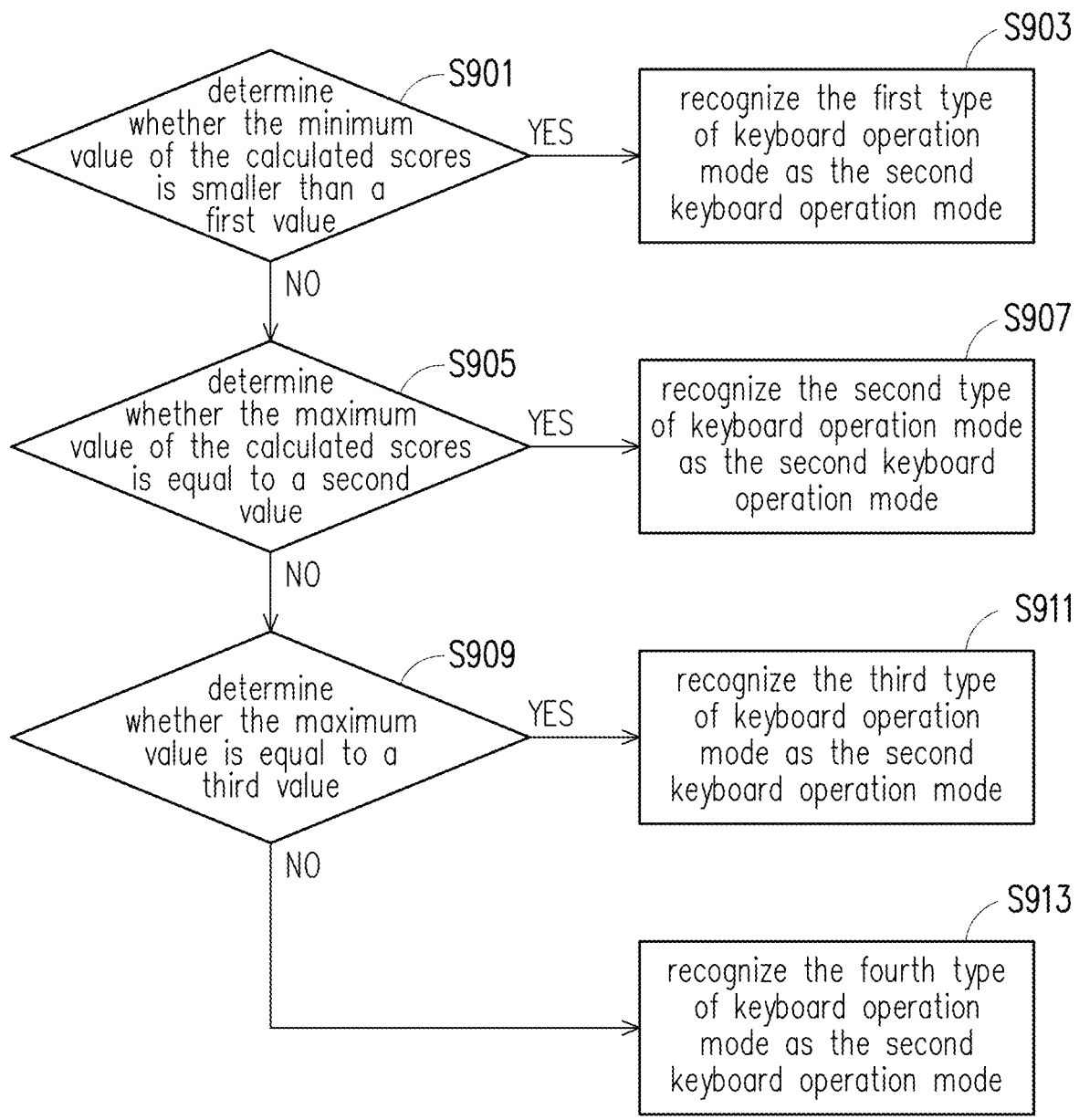
FIG. 9 is a flowchart of a method for determining a keyboard operation mode corresponding to a program that generates a window according to an object in an embodiment of the disclosure.

FIG. 9 is a flowchart of a method for determining a keyboard operation mode corresponding to a program that generates a window according to an object in an embodiment of the disclosure.

Referring to FIG. 9, after recognizing the object in the picture, the object detection module 100d calculates the score of each keyboard operation mode according to the following formula (1) to obtain multiple scores:

$$S_{Mode} = \frac{1}{c} \sum \frac{\Sigma \left( \frac{A_{Detected_i}}{A_{Define_i}} \right)}{O_{Define}} \times 100\% \quad (1)$$

In the formula, $S_{Mode}$ is a score of a keyboard operation mode to be calculated. C is the number of pictures that are captured. $O_{Define}$ is the total number of predefined objects in the keyboard operation mode to be calculated. In other words, the total number of predefined objects may be determined in advance and used to represent the number of objects expected to appear in the picture of the keyboard operation mode to be calculated. Taking Table 1 as an example, the object expected to appear in the picture in the typing mode is a toolbar only, so the value of $O_{Define}$ in the typing mode is "1"; the object expected to appear in the picture in the FPS mode includes guns, health points and number of bullets, so the value of $O_{Define}$ in the FPS mode is "3"; the object expected to appear in the picture in the racing mode includes cars, the hourly speed, the dashboard, the timer and the ranking, so the value of $O_{Define}$ in the racing mode is "5".

TABLE 1

| Keyboard operation mode | Object | $O_{Define}$ |
|---|---|---|
| Typing mode | Toolbar | 1 |
| FPS mode | Gun | 3 |
| | Health points | |
| | Number of bullets | |
| Racing mode | Car | 5 |
| | Hourly speed | |
| | Dashboard | |
| | Timer | |
| | Ranking | |

In addition, $A_{Detected_i}$ in formula (1) is the proportion of the area occupied by the i-th object in the captured picture. $A_{Define_i}$ is a predefined proportion of the area occupied by the i-th object in the picture. In other words, the predefined proportion of area may be the proportion of area that is determined in advance and used to represent the proportion of the area expected to be occupied by the i-th object in the picture of the keyboard operation mode to be calculated. Taking Table 2 as an example, the "toolbar" in the picture of typing mode is expected to account for 20% of the total area, so the value of $A_{Define_i}$ of the toolbar of typing mode is "20%"; the "gun" in the picture of the FPS mode is expected to account for 30% of the total area, so the value of $A_{Define_i}$ of the gun in the FPS mode is "30%", and the other values in Table 2 can be deduced in the same way, so related description are not repeated herein.

TABLE 2

|  | Toolbar | Gun | Health points | Number of bullets | Car | Hourly speed | Dashboard | Timer | Ranking |
| --- | --- | --- | --- | --- | --- | --- | --- | --- | --- |
| Racing mode | % | % | % | % | 30% | 10% | 10% | 10% | 10% |
| FPS mode | % | 30% | 10% | 10% | % | % | % | % | % |
| Typing mode | 20% | % | % | % | % | % | % | % | % |

After calculating the score for each keyboard operation mode, in step S901, the object detection module 100d determines whether the minimum value of the calculated scores is smaller than a first value. The first value is, for example, 80, but which should not be construed as a limitation to the disclosure. When the minimum value is smaller than the first value, in step S903, the object detection module 100d recognizes the linear mode (also referred to as the first type of keyboard operation mode) as the aforementioned second keyboard operation mode.

When the minimum value is not smaller than the first value, in step S905, the object detection module 100d determines whether the maximum value of the calculated scores is equal to a second value. The disclosure provides no limitation to the value of the second value, and the second value may be a predefined score of the racing mode, which may be obtained by experiment. When the maximum value is equal to the second value, in step S907, the object detection module 100d recognizes the racing mode (also referred to as the second type of keyboard operation mode) as the aforementioned second keyboard operation mode.

When the maximum value is not equal to the second value, in step S909, the object detection module 100d determines whether the maximum value is equal to a third value. The disclosure provides no limitation to the value of the third value, and the third value may be a predefined score of the FPS mode, which may be obtained by experiment. When the maximum value is equal to the third value, in step S911, the object detection module 100d recognizes the FPS mode (also referred to as the third type of keyboard operation mode) as the second keyboard operation mode.

When the maximum value is not equal to the third value, in step S913, the object detection module 100d recognizes the typing mode (also referred to as the fourth type of keyboard operation mode) as the second keyboard operation mode.

Referring again to FIG. 5, after the second keyboard operation mode is recognized in step S507, in step S505, when the current keyboard operation mode is different from the second keyboard operation mode, the mode switching module 100c switches the current keyboard operation mode currently used by the keyboard to the second keyboard operation mode so that the keyboard receives the user's input according to the second keyboard operation mode.

Specifically, assuming that step S505 is performed by using the second keyboard operation mode, in step S509, the feedback module 100e adds a new record to the database 110, wherein the new record (also referred to as the second record) includes the current title, the current process name and the second keyboard operation mode. Thereafter, assuming that both the database 110 and the cloud database 120 are connected, the cloud database 120 can synchronize with the database 110 to store (or add) this second record to the cloud database 120.

In summary, the keyboard mode switching system and method of the disclosure can automatically determine the application currently used by the user, and automatically switch to the keyboard operation mode corresponding to the application, thereby improving the efficiency of the user's rapid operation, optimizing the user experience and adding value to the product.

What is claimed is:

1. A keyboard mode switching system for switching between multiple keyboard operation modes of a keyboard, the system comprising:
   a database storing multiple records, wherein each of the multiple records is configured to store one of the multiple keyboard operation modes; and
   a processor configured to access multiple modules to perform the following operations:
   obtaining a current window information of a currently executed window;
   comparing the multiple records based on the current window information;
   when there is a first record corresponding to the current window information in the multiple records, switching a current keyboard operation mode currently used by the keyboard to a first keyboard operation mode in the first record so that the keyboard receives a user's input according to the first keyboard operation mode; and
   when the first record corresponding to the current window information does not exist in the multiple records, capturing at least one picture of the window, recognizing at least one object in the picture, determining a second keyboard operation mode corresponding to a program generating the window according to the object, and switching the current keyboard operation mode currently used by the keyboard to the second keyboard operation mode so that the keyboard receives the user's input according to the second keyboard operation mode,
   wherein, the keyboard mode switching system further comprises: a cloud database configured to store the multiple records, wherein
   the processor adds a second record to the cloud database, and the second record comprises a corresponding relationship between the current window information and the second keyboard operation mode; and
   the cloud database is synchronized with the database to store the second record in the cloud database.

2. The keyboard mode switching system according to claim 1, wherein the current window information comprises a current title and a current process name, at least one of a title and a process name in the first record matches the current title and the current process name.

3. The keyboard mode switching system according to claim 1, wherein in the operation of determining the second keyboard operation mode corresponding to the program that generates the window according to the object,
   the processor calculates multiple scores respectively corresponding to the multiple keyboard operation modes according to the object,
   the processor determines whether a minimum value among the multiple scores is smaller than a first value,
   when the minimum value in the multiple scores is smaller than the first value, the processor recognizes a first type of keyboard operation mode among the multiple keyboard operation modes as the second keyboard operation mode, when the minimum value in the multiple scores is not smaller than the first value, the processor determines whether a maximum value in the multiple scores is equal to a second value, when the maximum value in the multiple scores is equal to the second value, the processor recognizes a second type of keyboard operation mode among the multiple keyboard operation modes as the second keyboard operation mode, when the maximum value in the multiple scores is not equal to the second value, the processor determines whether the maximum value in the multiple scores is equal to a third value, when the maximum value in the multiple scores is equal to the third value, the processor recognizes a third type of keyboard operation mode among the multiple keyboard operation modes as the second keyboard operation mode, when the maximum value in the multiple scores is not equal to the third value, the processor recognizes a fourth type of keyboard operation mode among the multiple keyboard operation modes as the second keyboard operation mode.

4. The keyboard mode switching system according to claim 3, wherein in the operation of calculating the multiple scores respectively corresponding to the multiple keyboard operation modes based on the object, the processor calculates the multiple scores according to the following formula:

$$S_{Mode} = \frac{1}{c}\sum \frac{\Sigma\left(\frac{A_{Detected_i}}{A_{Define_i}}\right)}{O_{Define}} \times 100\%$$

wherein SMode is a score of a keyboard operation mode to be calculated, C is the number of the pictures that are captured, ODefine is a total number of predefined objects in the keyboard operation mode to be calculated, ADetectedi is a proportion of an area occupied by the i-th object in the captured picture, ADefinei is a predefined proportion of an area occupied by the i-th object in the picture.

5. The keyboard mode switching system according to claim 1, wherein each of the multiple records includes a title of a window, a process name and one of the multiple keyboard operation modes.

6. The keyboard mode switching system according to claim 1, wherein the multiple keyboard operation modes include a game mode and a typing mode.

7. The keyboard mode switching system according to claim 1, wherein when there is the first record corresponding to the current window information in the multiple records, and a keyboard operation mode in the first record is different from the current keyboard operation mode currently used by the keyboard, the processor switches the current keyboard operation mode currently used by the keyboard to the first keyboard operation mode in the first record.

8. The keyboard mode switching system according to claim 1, wherein the processor uses a window application program interface (WinAPI) to obtain a current title and a current process name as the current window information.

9. A keyboard mode switching method for a keyboard mode switching system to switch between multiple keyboard operation modes of a keyboard, the method comprising:

storing multiple records in a database, wherein each of the multiple records is configured to store one of the multiple keyboard operation modes;

obtaining a current window information of a currently executed window;

comparing the multiple records based on the current window information;

when there is a first record corresponding to the current window information in the multiple records, switching a current keyboard operation mode currently used by the keyboard to a first keyboard operation mode in the first record so that the keyboard receives a user's input according to the first keyboard operation mode;

when the first record corresponding to the current window information does not exist in the multiple records, performing following operations:

capturing at least one picture of the window;

recognizing at least one object in the picture, determining a second keyboard operation mode corresponding to a program generating the window according to the object; and switching the current keyboard operation mode currently used by the keyboard to the second keyboard operation mode so that the keyboard receives the user's input according to the second keyboard operation mode;

adding a second record to a cloud database, wherein the second record comprises a corresponding relationship between the current window information and the second keyboard operation mode; and synchronizing the cloud database with the database to store the second record in the cloud database.

10. The keyboard mode switching method according to claim 9, wherein the current window information comprises a current title and a current process name, at least one of a title and a process name in the first record matches the current title and the current process name.

11. The keyboard mode switching method according to claim 9, wherein the step of determining the second keyboard operation mode corresponding to the program that generates the window according to the object comprises:

calculating multiple scores respectively corresponding to the multiple keyboard operation modes based on the object;

determining whether a minimum value among the multiple scores is smaller than a first value;

when the minimum value in the multiple scores is smaller than the first value, recognizing a first type of keyboard operation mode among the multiple keyboard operation modes as the second keyboard operation mode;

when the minimum value in the multiple scores is not smaller than the first value, determining whether a maximum value in the multiple scores is equal to a second value;

when the maximum value in the multiple scores is equal to the second value, recognizing a second type of keyboard operation mode among the multiple keyboard operation modes as the second keyboard operation mode;

when the maximum value in the multiple scores is not equal to the second value, determining whether the maximum value in the multiple scores is equal to a third value;

when the maximum value in the multiple scores is equal to the third value, recognizing a third type of keyboard operation mode among the multiple keyboard operation modes as the second keyboard operation mode;

when the maximum value in the multiple scores is not equal to the third value, recognizing a fourth type of keyboard operation mode among the multiple keyboard operation modes as the second keyboard operation mode.

12. The keyboard mode switching method according to claim 11, wherein the step of calculating the multiple scores respectively corresponding to the multiple keyboard operation modes according to the object comprises:

calculating the multiple scores according to the following formula:

$$S_{Mode} = \frac{1}{c} \sum \frac{\left(\frac{A_{Detected_i}}{A_{Define_i}}\right)}{O_{Define}} \times 100\%$$

wherein SMode is a score of a keyboard operation mode to be calculated, C is the number of the pictures that are captured, ODefine is a total number of predefined objects in the keyboard operation mode to be calculated, ADetectedi is a proportion of an area occupied by the i-th object in the captured picture, ADefinei is a predefined proportion of an area occupied by the i-th object in the picture.

13. The keyboard mode switching method according to claim 9, wherein each of the multiple records includes a title of a window, a process name and one of the multiple keyboard operation modes.

14. The keyboard mode switching method according to claim 9, wherein the multiple keyboard operation modes include a game mode and a typing mode.

15. The keyboard mode switching method according to claim 9, further comprising:

when there is the first record corresponding to the current window information in the multiple records, and a keyboard operation mode in the first record is different from the current keyboard operation mode currently used by the keyboard, the processor switches the current keyboard operation mode currently used by the keyboard to the first keyboard operation mode in the first record.

16. The keyboard mode switching method according to claim 9, wherein step of obtaining a current window information of a currently executed window comprising:

using a window application program interface (WinAPI) to obtain a current title and a current process name as the current window information.

* * * * *